July 25, 1967  J. W. CLARK  3,332,467
BEAD BREAKING TOOL

Filed July 12, 1965  2 Sheets-Sheet 1

INVENTOR
Joseph W. Clark
BY Maury I. Hull
ATTORNEY

July 25, 1967    J. W. CLARK    3,332,467
BEAD BREAKING TOOL
Filed July 12, 1965    2 Sheets-Sheet 2

United States Patent Office 3,332,467
Patented July 25, 1967

3,332,467
BEAD BREAKING TOOL
Joseph W. Clark, Irwin, Pa., assignor of twenty-five percent to Mrs. W. E. Horrocks, Irwin, Pa.
Filed July 12, 1965, Ser. No. 471,248
12 Claims. (Cl. 157—1.17)

This invention relates to new and useful improvements in tire tools, and more particularly to a novel device utilizing force obtained from a jack or other force-applying member for loosening pneumatic tire casings from the flanged wheel rims or drop center rims on which they are mounted.

The most difficult step in removing a tire from a rim in order to repair the tire is "breaking" the bead, that is, disengaging the annular tongue or annular strip around the inner periphery of the wall of a pneumatic tire shaped for engaging the rim of the wheel, or moving the bead out of the trough of a drop center rim. This is true regardless of how well the tire has been deflated, for the material of the tire has sufficient stiffness to maintain the bead firmly against the flange of the rim or in the trough of the rim; if a good cement has been used when the tire was mounted, the tire adheres even more strongly to the flange or rim. "Breaking" the bead refers to causing the bead to move out of the trough or away from the flange of the rim; once the bead has been moved away from the flange or trough for a short portion of the perimeter of the flange it is relatively easy to force it away around the remainder of the flange.

It is old in the art to use a jack-like tool having a tool head secured to a jack shaft, and to manipulate the jack to exert force or pressure on a tire near the bead to "break" the bead. However, these devices are cumbersome and expensive, difficult to operate, and take up a great deal of space in a trunk or tool compartment. Their use in compact automobiles or small sports automobiles is prohibited by space limitations.

Although many patents have issued in the past several decades employing jacks or jack-like devices for mounting or dismounting tires, they all suffer from the same disadvantage; they are large, heavy and cumbersome, and the tool portion which actually comes in contact with the bead or tire is integral with the rest of the apparatus, in the case of jacks.

Furthermore, it appears that no attempt has ever been made to construct a tool head which applies force to the tire in a scientific manner, that is, first to apply pressure to the bead, and after the bead has been broken at one point to constantly increase the area of the tire wall against which force is applied as the tire wall is moved inward.

It occurred to me that it would be a distinct advantage to have a bead breaking tool which would be small and convenient to carry and which could be used with substantially any available jack or other force-applying apparatus for dismounting a tire, and I have invented a tool which overcomes the disadvantages and limitations of the prior art, and satisfies a long existing need. My tool can be operatively connected to the shaft of most conventional jacks carried for tire changing, for example a bumper jack, and coupled to the jack shaft in place of the base or head, depending upon the type of jack and the manner in which it is used. The jack is then actuated after disposing the tire in a position whereat the jack is used to apply force to my bead breaking tool or attachment to force the bead of the tire to a "broken" position. If the jack has a detachable foot or base, as many conventional jacks do, the jack may be used in its normal upright position, my tire tool being substituted for the jack base, the arm of the step-by-step mechanism or other moving portion of the jack resting against the bumper or other stationary abutment. For conventional hydraulic jacks, the jack may be turned upside down, its base disposed under a bumper or fender, and the tire placed under the bumper or fender so that the jack "works" between the fender or bumper and my tool fitted against the side wall of the tire.

Further, my tool has a bevelled surface area terminating in a very thin portion which easily slips between the flange of the rim and the bead, when the tool is first applied to the tire before the bead is broken, and this thin portion has a curved edge which fits against the curved surface of the rim. The tool is carefully dimensioned to have a wide, generally flat surface on the front side, that is, the side adjacent the tire, for applying force over a large area of the wall of the tire to insure separating the bead from the rim over a substantial distance. Each tool may be dimensioned to fit any selected size wheel, 13, 14 or 15 inch, etc.

Still further, I have discovered that by having the end of the jack shaft or other means for applying force to the tool slidable over the back surface thereof at least a predetermined distance within a collar or shackle, as the tool presses the tire wall inward the point or area on the back surface at which force is applied automatically adjusts itself for maintaining at maximum the portion of the tire wall forced inwardly.

In another embodiment of my invention, I use a tool with a corrugated surface on the front side for preventing sliding movement of the tool out of place as the tire wall moves inward; in still another embodiment I provide a tool with a socket, and I also provide a coupling member having a ball portion fitting into the socket and a collar portion for attaching or coupling to a number of different types of jack shafts or other force applying members.

Accordingly, a primary object of my invention is to provide a new and improved bead breaking tool offering advantages over any now known in the art.

Another object is to provide a new and improved bead breaking tool in which a jack shaft may be used to apply force to the tire to break the bead.

Still another object is to provide bead breaking apparatus including a tool for fitting against the wall of the tire and a coupling member for coupling the tool to a force applying member.

A further object is to provide a new and improved bead breaking attachment adapted to grip the side wall of a tire.

Still a further object is to provide a bead breaking tool having a portion especially shaped to fit between the flange of the rim and the wall of the tire, or in other words, to fit into the trough beside the bead.

A further object is to provide a simple bead breaking tool which can be used by a do-it-yourself layman.

An additional object is to provide a bead breaking tool in which the point of applying force automatically adjusts itself for maximum effectiveness as the tool forces the wall of the tire inward away from the rim.

Yet another object is to provide a new and improved tire tool in which force is applied to the side wall of the tire over a wide area thereof.

These and other objects will become more clearly apparent after a study of the following specification, when read in connection with the accompanying drawings, in which.

Figure 1:
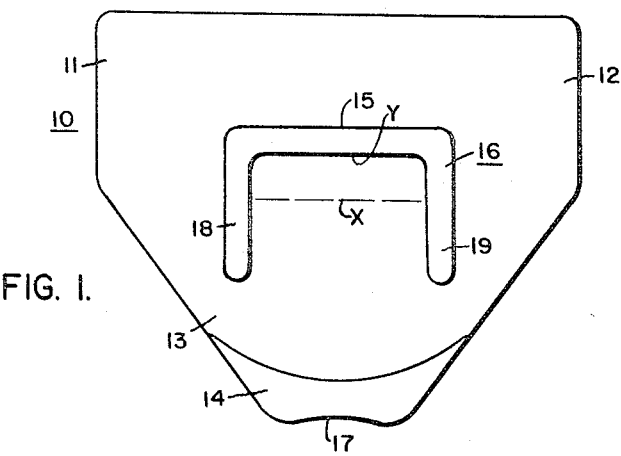
FIG. 1 is a plan view of my bead breaking jack attachment according to one embodiment of my invention.

Referring now to the drawings, in which like reference numerals are used throughout to designate like parts, for a more detailed understanding of the invention, and in particular to FIG. 1 thereof, a generally plate-like tool generally designated 10 has a plate portion 11 consisting of a rectangular portion 12 of large surface area and a truncated triangular portion 13 with a bevelled surface 14 terminating in a thin knife-like portion with a curved edge 17 shaped in a manner to fit against the rounded rim, and thin enough to slip or be driven between the bead and the flange of the rim. A three sided collar or shackle generally designated 16 is welded or otherwise secured to the plate portion 11, having three sides 15, 18, and 19 and an open side facing the edge 17. Collar 16 may be formed integrally with plate portion 11 if desired.

Figure 2:
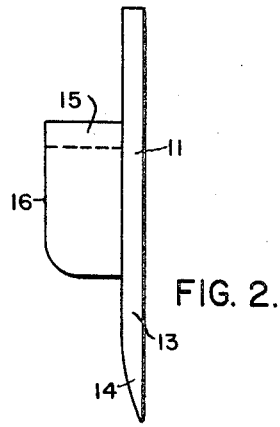
FIG. 2 is a side elevational view of the tool or jack attachment of FIG. 1.

FIG. 2, a side elevational view, shows additional details of plate portion 11, triangular portion 13, bevelled surface 14, and collar 16.

Figure 3:
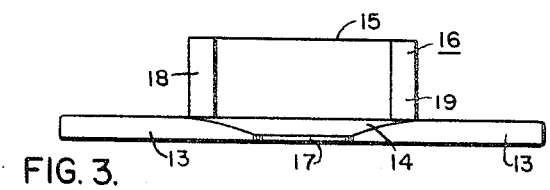
FIG. 3 is an elevational view from the rim end of the tool of FIG. 1.

FIG. 3, an elevational view looking at the tool from the end or side thereof which fits under the flange of the rim, shows the slope of bevelled surface 14, and the height of the walls 18, 15, and 19 of collar 16.

Figure 4:
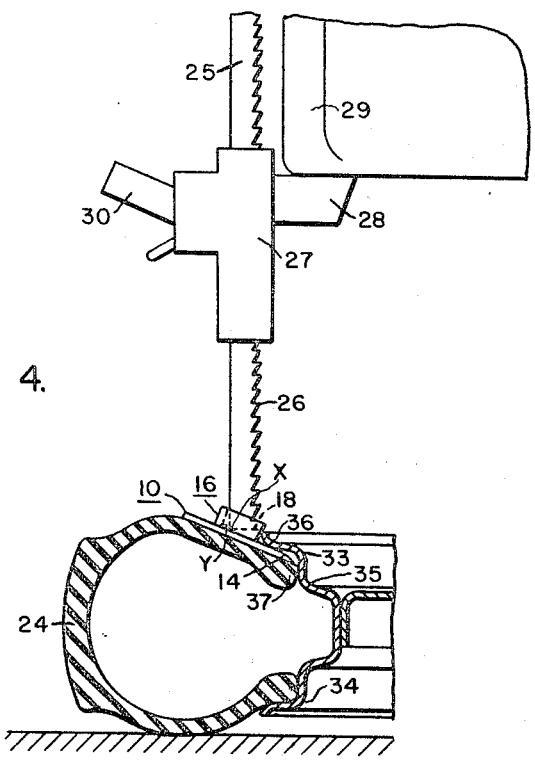
FIG. 4 is a side elevational view showing the tool in operative position with a pneumatic tire.

Particular reference is made now to FIG. 4, which shows the tool in operative position with respect to a pneumatic tire. A jack having a jack post or jack shaft 25 with rack teeth 26 has a movable portion including a step-by-step mechanism 27 with support or arm 28 being inserted under, for example, bumper 29 of the car. The jack has lever 30 for adjusting the position of the support 28 along the length of the post or shaft 25. Tool 10 is seen mounted in bead breaking position with the bevelled surface portion slipped between the side of tire 24 and the flange 36 of a drop-center wheel rim 35, as by driving the tool into the position shown with a hammer. The curved edge 17, not shown in FIG. 4, abuts against the curved surface of rim 35. The beading of the tire is shown at 37. The rim is of the drop-center type and has troughs 33 and 34.

With the tool 10 in the position shown, it is seen that the end of jack shaft 25 passes between side walls 18 and 19 of collar 16, and touches the surface of the tool at point "X," some distance from the inner wall of side 15. As force is applied to tool 10 from jack shaft 25 pressing the tool downward, the lower end of the jack shaft slides along the upper or back surface of tool 10, as seen in FIG. 4, until point "Y" is reached. This movement of the point at which force is applied takes place as the tool is forced inward against the wall of the tire, and is an important feature of this embodiment of the invention, because it results in automatic shifting of the force point in a manner which tends to apply more force, or a greater component of force, to the rectangular portion 11 of the tool as more force is needed there to move a longer section of the tire wall inward and disengage a longer section of the bead from the rim. The efficiency of the device is thus maximized by the automatic shifting or adjustment of the point at which force is applied.

Figure 5:
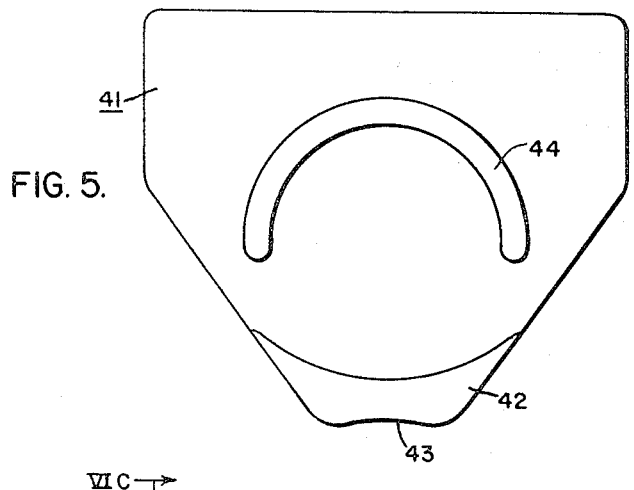
FIG. 5 is a plan view of my bead breaking tool or jack attachment according to a second embodiment of my invention.

Particular reference is made now to FIG. 5, in which a second embodiment of the invention is shown. Tool member 41 is similar to tool 10, having bevelled surface 42 with rounded edge 43. Tool 41 has a semicircular collar 44 mounted thereon and secured thereto or formed integrally therewith as desired. Semicircular collar 44 is employed where the jack shaft is round in cross section; it operates in a manner generally similar to collar 16, and the adjacent or back surface of tool 41 is used in a manner similar to the corresponding back surface of tool 10.

Figure 6A:
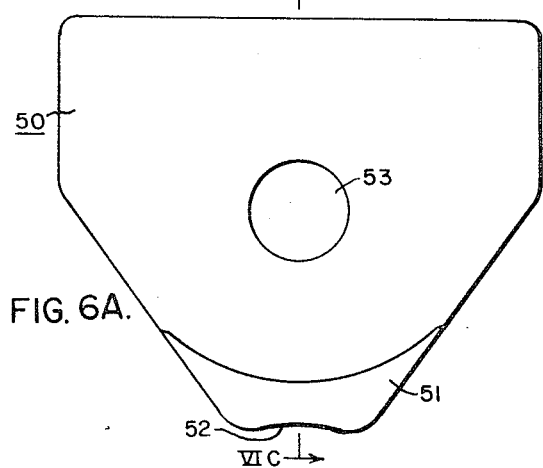
FIG. 6A is a plan view of my tool according to a third embodiment of my invention.
Figure 6B:
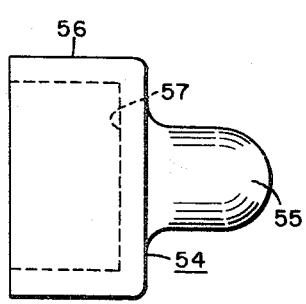
FIG. 6B is a view of a tool-to-jack shaft coupling member employed in the embodiment of FIG. 6A.
Figure 6C:
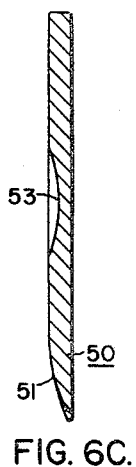
FIG. 6C is a cross-sectional view of the tool taken on line VIC—VIC of FIG. 6A.

Particular reference is made now to FIGS. 6A, 6B, and 6C in which a third embodiment of my invention is shown. Tool 50 having bevelled surface 51 with circular edge 52 has a semispherical hole therein forming a socket for receiving the ball portion 55 of a coupling member generally designated 54 also having collar portion 56. Collar portion 56 may be circular or semicircular, or may be rectangular or three-sided, depending upon the cross section of the jack shaft employed, or all sides may be closed if desired. A force applying member rests or presses against surface 57 and transmits force to tool 50 by way of ball portion 55 in socket 53. In this embodiment, the angle at which the ball fits in the socket changes as the tool moves the tire wall inward, tending to apply more force to the large flat area of the tool and the side of the tire.

Figure 7A:
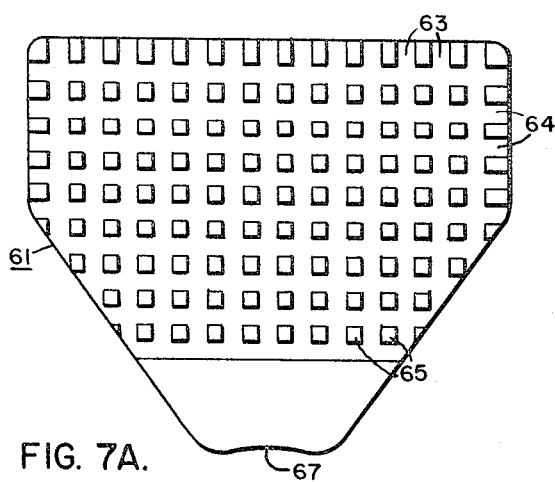
FIG. 7A is a bottom view of a tool according to a fourth embodiment of my invention, showing the front surface which fits against the tire.
Figure 7B:
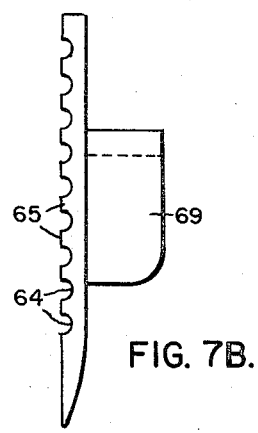
FIG. 7B is a side elevational view of the tool or attachment of FIG. 7A.

Particular reference is made now to FIGS. 7A and 7B where a tool according to still an additional embodiment of the invention is shown, in which the front surface of the tool which rests against the tire wall is corrugated or roughened to form rows of studs, projections or teeth 65, these being formed by parallel grooves 64 extending in one direction and parallel grooves 63 extending in another direction, which may be but is not necessarily substantially perpendicular to the first named direction. The teeth tend to bite into the side wall of the tire as force is applied to the tool, preventing slipping of the tool with respect to the wall of the tire.

Whereas I have described my invention with respect to a jack as the member for applying force to the tool, it should be understood that my invention is not limited to use with a jack, but that other force applying means may be employed, such as a manually operated metal bar, or a force applying member driven by any suitable means.

The assembly of a tire while mounted on a rim is generally toroidal in shape; it has a large circumferential dimension measured in the plane of the tire, and a small circumferential dimension measured in a plane transverse to the plane of the tire, and substantially perpendicular to a line bounding the large circumference of the tire. In the claims appended hereto, when the tool or point of application of force is located with respect to the "cross-sectional perimeter," it means the location on a curved line, path, or strip in the small circumferential dimension of the tire, taken in a plane substantially perpendicular or transverse to a line bounding the large circumference of the tire.

Whereas I have shown and described my invention with respect to some embodiments thereof which give satisfactory results, it should be understood that changes may be made and equivalents substituted without departing from the spirit and scope of the invention.

I claim as my invention:

1. As an article of manufacture, a tool adapted to be coupled to the shaft of a jack and to be disposed adjacent the bead of a tire mounted on a rim and to have force applied thereto by manipulation of the jack, the force being applied in a direction to cause the tool to break the bead, the tool having a rectangular main plate portion which is generally flat and a part shaped generally like a truncated triangle, the triangular part fitting adjacent the bead and the rectangular part fitting adjacent the side wall of the tire, and a coupling portion secured to the plate portion and shaped to generally receive the end of the jack shaft and maintain the end of the jack shaft slidably abutting against the adjacent surface of the plate portion, the coupling portion being partially on the rectangular part and partially on the triangular part whereby the major portion of the force from the jack shaft is first applied to the bead and thereafter applied to the tire wall.

2. As an article of manufacture, a tool adapted to be placed against the side wall of a deflated pneumatic tire mounted on a rim, the tool having a generally flat surface portion adapted to fit against the tire wall, the tool also having a thin surface portion with a curved edge adapted to fit into the trough between the bead and the flange of the rim, the tool having a collar on the surface opposite to the generally flat surface adapted to receive the end of a force applying member for exerting force against the bead and radially against the side wall of the tire, the end of the force applying member sliding within the collar in a direction away from the rim as the tire wall moves inward in response to the force applied thereto, whereby force is applied to the bead and to the side wall of the tire in a manner to move a substantial portion of the tire wall inward away from the flange of the tire rim.

3. A tool according to claim 2 further characterized in that the surface portion with the curved edge is generally in the form of a truncated triangle with a curved edge which fits against the rim, and the generally flat surface is generally rectangular in shape and covers a substantial area of the tire wall whereby force is applied to said substantial area.

4. A tool according to claim 2 wherein the collar is rectangular with an open side, the open side facing the thinner surface with the curved edge.

5. A tool according to claim 2 wherein the collar is semicircular in shape.

6. A tool according to claim 2 wherein the surface of the tool adjacent the tire wall is corrugated.

7. Bead breaking tire tool apparatus comprising in combination a tool member adapted to be placed against the sidewall of a deflated pneumatic tire mounted upon a rim, the tool member having a generally flat surface adapted to fit against the tire wall, the opposite surface having a socket therein, the tool member having a thin portion with a curved edge adapted to fit between the flange of the rim and the bead, and a coupling member having a ball portion which fits in said socket and a collar portion adapted to receive the end of a force applying member for exerting force against the tool member and thence against the bead and radially against the side wall of the tire, the tool member applying force over a substantial area of the wall of the tire.

8. Bead breaking tire tool apparatus according to claim 7 in which the surface of the tool member to be placed against the tire wall is corrugated.

9. A tool for breaking the bead of a tire mounted on a rim including means having a generally flat surface portion of substantial area for disposing against the wall of the tire and a thin surface portion having a curved edge for inserting into the trough between the bead of the tire and the flange of the rim upon which the tire is mounted, the first-named portion having a back surface away from the tire at least a portion of which is substantially flat, the flat portion of the back surface being adapted to have a force applying member abut thereagainst, and a retaining member for the force applying member permitting substantially continual adjustment of the point at which force is applied to the tool by the force applying member as the tool moves in following the tire wall as it is forced inward.

10. A tool for breaking the bead of a deflated tire mounted on a rim having a flange portion, the tool including means having a generally flat surface of substantial area for being disposed against the wall of the tire and a tapering surface having a curved edge for inserting between the bead and the flange, the surface opposite to the flat surface being adapted to have a force applying member abut thereagainst, and a retaining member on said opposte surface adapted to restrain movement of the force applying member along said last named surface in certain directions to provide for substantially continuous adjustment of the point at which force is applied as the tool forces the wall of the tire inward.

11. A tool for breaking the bead of a deflated tire mounted on a rim having a flange portion, the tool including means having a generally flat surface of substantial area for disposing against the wall of the tire and a thin tapering surface having a curved edge for inserting between the bead and the flange, the surface opposite to the flat surface being adapted to have a force applying member abut thereagainst, and a collar on said opposite surface having three closed sides with an open side facing the curved edge, the collar being adapted to restrict movement of the force applying member along said last named surface as the tool forces the wall of the tire inward.

12. A tool according to claim 11 in which the surface adjacent the wall of the tire is corrugated.

References Cited

UNITED STATES PATENTS

| | | | |
|---|---|---|---|
| 2,433,113 | 12/1947 | Graves et al. | 157—1.28 |
| 2,571,517 | 10/1951 | Aycock | 157—1.17 |
| 2,621,715 | 12/1952 | Lien et al. | 157—1.26 |
| 2,691,412 | 10/1954 | Wood | 157—1.26 |
| 2,786,517 | 3/1957 | Hammer | 157—1.17 |

GRANVILLE Y. CUSTER, Jr., *Primary Examiner.*